United States Patent [19]

Bolognia et al.

[11] Patent Number: 5,785,172
[45] Date of Patent: Jul. 28, 1998

[54] DOUBLE ROSETTE FOR COMPACT DISC CONTAINER

[75] Inventors: David Bolognia, Lanesboro; George Rufo, Jr., Dalton; Alvin Thomas, Pittsfield, all of Mass.

[73] Assignee: Lakewood Industries, Inc., Pittsfield, Mass.

[21] Appl. No.: 580,326

[22] Filed: Dec. 28, 1995

[51] Int. Cl.⁶ .................................................. B65D 85/30
[52] U.S. Cl. ..................... 206/308.1; 206/310; 206/312; 206/493
[58] Field of Search ............................. 206/307.1, 308.1, 206/309, 310, 312, 313, 493

[56] References Cited

U.S. PATENT DOCUMENTS

| | | | |
|---|---|---|---|
| 5,244,085 | 9/1993 | Lammerant et al. | 206/308.1 |
| 5,259,498 | 11/1993 | Weisburn et al. | 206/308.1 |
| 5,284,243 | 2/1994 | Gelardi et al. | |
| 5,284,248 | 2/1994 | Dunker | 206/308.1 |
| 5,417,324 | 5/1995 | Joyce et al. | 206/308.1 |
| 5,425,450 | 6/1995 | Lin | 206/308.1 |
| 5,494,156 | 2/1996 | Nies | 206/493 |
| 5,515,968 | 5/1996 | Taniyama | 206/308.1 |
| 5,626,225 | 5/1997 | Joyce, Jr. | 206/308.1 |

*Primary Examiner*—Paul T. Sewell
*Assistant Examiner*—Nhan T. Lam
*Attorney, Agent, or Firm*—Cain, Hibbard, Myers & Cook; William F. Mufatti, Esquire

[57] ABSTRACT

A storage tray for holding and receiving at least two compact discs wherein the storage tray has a double rosette consisting of an upper and lower rosette the extremities of the cantilever members (fingers) of which form a circular opening having a common center. The double rosette is on at least the same side of the storage tray. Also a storage container or jewel box consisting of a cover and a base pivotally attached at the same end thereof and containing the storage tray with the double rosette.

12 Claims, 1 Drawing Sheet

5,785,172

DOUBLE ROSETTE FOR COMPACT DISC CONTAINER

BACKGROUND OF THE INVENTION

The present invention relates to a storage container for holding disc shaped elements having electronically stored recordings thereon and having a cylindrical opening in the center of the disc shaped element. The storage containers for such discs are commonly referred to as "jewel boxes", and the disc shaped elements are commonly referred to as compact discs or just "CD's". The storage container has, as a component thereof, a tray on which the disc shaped element is seated. More specifically, this invention is directed to the storage tray for storing and securing at least one CD in place, wherein the tray has a particular centrally located circular arrangement of raised flexible cantilever members generally disposed around a raised seat and extending inwardly. The ends of the cantilever members form an essentially circular opening. The central opening of the disc shaped element is secured over the circular raised flexible cantilever members. The members are generally flexible in that they can move inwardly under slight pressure such as when positioning the disc shaped element over the cantilever members and upon release of the pressure the cantilever members spring back or outwardly thereby securing the disc shaped element. The circular cantilever members engage and secure the disc shaped element in place during storage. The circular arrangement of the cantilever members is often referred to as a "rosette" and the cantilever members themselves are referred to as "petals" or "fingers". Hereinafter, the storage container shall be referred to as a "jewel box"; the disc element as a "CD"; the circular arrangement of cantilever members as a "rosette"; and the cantilever members as "fingers".

More particularly, this invention is directed to a unique arrangement of the circular raised fingers disposed around a circular opening in the tray. Specifically, the arrangement consists of two sets of raised fingers so as to receive at least two compact discs in a standard single CD jewel box.

Jewel boxes for holding a CD having electronically stored recordings thereon are well known to the public particularly in the entertainment field and in the information storage field. These jewel boxes for CD's are so designed to hold generally one such CD. In fact, in one case, an insertable tray has been invented and is used commercially wherein a single CD jewel box can be converted into a two CD jewel box by employing the insertable tray (U.S. Pat. No. 5,284,243) without essentially changing the dimensions or configuration of the single CD jewel box.

The trays or CD holders employed in jewel boxes to support and secure CD's are generally made from pigmented thermoplastic molding resins having a varying degree of impact resistance. As such, the tray, particularly the rosette part of the tray around which the CD is seated, is able to withstand loading forces or impact during assembly, loading of the CD into the jewel box, shipping and then handling by the ultimate consumer or user of the CD.

However, the insertable tray, while excellent for converting a single CD container into a two CD container, does require the CD's to be on opposite sides of the tray. While this in itself is not inconvenient, it nevertheless does not expose the bottom CD until the tray is rotated at the hinged end of the jewel box, i.e. at the living hinge of the insertable tray as recited in the patent. Thus, one could remove the bottom CD and another would not be aware of such removal until the tray is rotated to expose the bottom of the tray.

Thus, with the double rosette arrangement of this invention, the two CD's are immediately exposed upon opening the CD jewel box. The double rosette arrangement is also applicable to the insertable tray of U.S. Pat. No. 5,284,243 which is incorporated herein by reference.

Therefore, it is an object of this invention to provide a storage container and tray for holding and securing at least two CD's.

Another object of the present invention is to provide a CD tray having a double rosette on the same side of a storage tray around which at least two CD's can be seated and secured.

These and other objects of this invention will become apparent from the following description.

SUMMARY OF THE INVENTION

This invention is directed to a particular tray for storing and securing at least two CD's. More particularly, the invention is found in the rosette wherein the rosette comprises at least two rosettes centrally located on the tray, both of which describe a circle around a common center and capable of storing at least two CD's superimposed over each other. The CD's are seated around the rosette and secured in place by the fingers of the double rosette. In general, most CD trays have a rosette for storing and securing CD's on a storage tray. Most, if not all, CD's are circular in shape, generally have electronically stored recording on the surface thereof by a variety of means, and have a centrally located circular opening or, simply, a hole in the center thereof. The hole provides the convenience for setting the CD on a spindle of a play back device. Today, CD's are commonly known in the entertainment field, particularly for musical recordings. However, compact discs (CD's) come in a variety of different sizes (including micro discs) and may be used to digitally record sound (audio-CD's), images (photo CD's), data (CD-ROMs), combinations thereof and the like.

The centrally located opening in the CD also allows for seating the CD around the rosette which stores and secures the CD onto the tray. The rosette consists of raised cantilever members (fingers) and are flexible so that they can move inwardly under a slight pressure and can spring back, without breaking, when the pressure is released. When the CD is placed over the fingers and forced onto the bottom of the tray or alternatively a raised seat from which the fingers emanate or radiate inwardly from either the bottom of the tray or the seat, the fingers move inwardly as the CD is forced onto the seat. As the CD is seated, the fingers spring back securing the CD in place.

The CD is generally supported by a seat as described above so that the CD avoids contact with the bottom part of the tray and is secured in place by the fingers of the rosette. The CD may also be peripherally supported at the outer edges of the CD tray upon which there is generally no recording so as to further enhance support of the CD with further insurance of avoiding contact of the surface of the CD with either the base of the tray carrying the CD or the cover of the storage container.

In the present market, the majority of CD's are packaged in a standard jewel box as a single CD container. With this invention, a standard single CD jewel box can be made into a two CD container without essentially modifying or changing dimensions and/or configuration of the standard single CD jewel box.

DETAILED DESCRIPTION OF THE INVENTION

As stated previously, this invention is directed to a double rosette means for storing and securing at least two CD's, which double rosette is on the same side of the tray. The double rosette means consists essentially of fingers having different heights which are situated in approximately the center of a tray onto which the CD's are seated and stored. In some containers, the tray is the bottom part of a container for the storing of the CD with a rotatable cover thereover that may be hinged by pins at one end of the tray. Alternatively, in other containers, the tray may be removably attached to the bottom part of the container. Generally, a cover is rotatably attached to the bottom part of the container. However, in the practice of this invention, the critical feature is in the rosette. It is applicable to whether the container holds one, two or more CD's with one or more storage trays, or has an insertable tray for converting a single CD container into a two or more CD container or whether the container consists of a series of stackable trays.

In one embodiment of this invention, the double rosette comprises a centrally located set of fingers consisting of a series of individual fingers emanating from the bottom or base of the storage tray wherein some, but not all, of the fingers are of a higher dimension than the other fingers of the double rosette, all of which, however, extend inwardly such that the ends thereof describe a circular opening around a common center. Preferably, alternate or every other finger is of a higher dimension than the other fingers of the double rosette. This invention is referred to as a double rosette since the taller fingers, i.e., the fingers with the higher dimension form one rosette and the other shorter fingers also form another rosette, both of which have a common center. For the purposes of simplicity, the rosette made up of the shorter fingers shall be referred to as the "lower rosette" and the rosette made up of the higher fingers shall be referred to as the "upper rosette". In this embodiment, each of the fingers are flexible and capable of independent movement, each being secured or attached at the base or flat plane of the tray. The fingers will each preferably have a slight protrusion on the outer side of the fingers or indentation to provide for a snap-fit of the CD onto each rosette set. The top of the fingers of each rosette will preferably be in a plane that is essentially parallel to the plane of the base of the tray. The purpose of the above configuration is to accommodate a two rosette arrangement in the space between the top cover and bottom cover or bottom part of a single CD jewel box. While it is not essential that the top of the fingers be in a plane parallel to the base of the tray or form a flat surface, it is preferred, however, with the only limitation being the space between the top and bottom cover of a standard jewel box as indicated above.

As the CD's are placed over the rosettes in a snap-fit arrangement, the bottom CD, which snap fits over the lower rosette, may either come to rest on the bottom plane of the tray or alternatively and preferably, will come to rest and be supported by a circular seat or raised rim around the rosettes.

The second CD, on the other hand, which is in a snap-fit arrangement over the upper rosette, will come to rest and be supported by the flat top formed at the extremities of the fingers of the lower rosette.

Both rosettes preferably have a circular opening in the middle thereof formed by the outer extremities of the fingers, i.e., the fingers of both the upper and lower rosette form a circle with a common center.

This invention is applicable to any moldable thermoplastic resin whether the thermoplastic resin is clear, translucent or opaque, pigmented, tinted or otherwise, or is a low, medium or high impact thermoplastic resin, etc. This invention may be advantageous to employing crystal polystyrene and other styrenic polymers such as copolymers and terepolymers containing styrene copolymerizeable with other monomers, as well as other thermoplastic resins such as polycarbonate, acrylonitril-butadiene-styrene (ABS), polysulfone, etc. These thermoplastics may also be pigmented.

The novel feature of this invention is in providing a storage tray with a novel rosette that is capable of converting a single CD standard jewel box into a two CD jewel box without essentially any significant modification of the single CD standard jewel box other then for the rosette configuration for holding and securing two CD's. This rosette means of this invention has been commonly referred to herein as a double rosette. As also stated previously, the double rosette of this invention may also be applicable to the insertable tray invention described and claimed in U.S. Pat. No. 5,284,243, which has been incorporated herein by reference. However, a modification of the insertable tray would be necessary in that the rosette on the top plane and bottom plane of the insertable tray would need to be designed to have the double rosette configuration on one side only, preferably the top side of the tray. There would be no rosette on the opposite side simply because there would not be sufficient space for either a rosette or a third CD on the bottom side of said insertable tray. However, it is conceivable that if the container were enlarged, i.e., the space between the top cover and base of the container were to be increased, then the insertable tray may have a double rosette on one side and a single or double rosette on the opposite side so as to accommodate three or four CD's depending on the space between the cover and base.

DETAILED DESCRIPTIONS OF THE DRAWINGS

Figure 1:
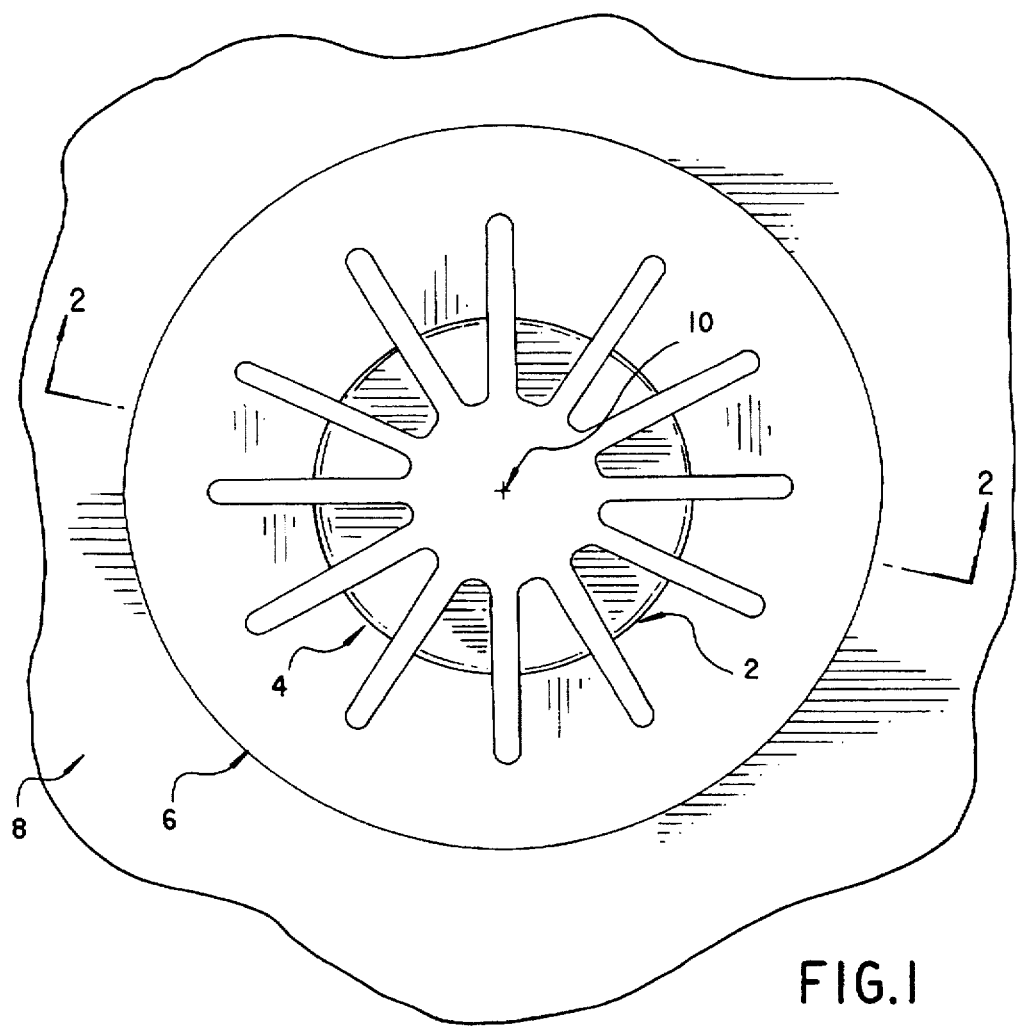
FIG. 1 is a top view of an embodiment of the double rosette of this invention showing the fingers of the upper rosette by the shaded areas and the fingers of e rosette by the clear areas.

In FIG. 1, the upper rosette comprises fingers 2, while fingers 4 comprise the lower rosette with support rim (raised surface) 6 for support of a CD (not shown) when secured by the lower rosette, both have a common center 10 and all part of storage tray 8.

Figure 2:
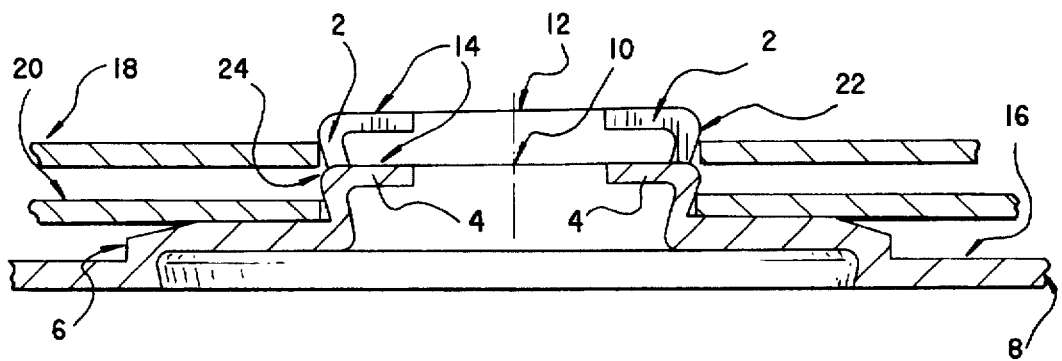
FIG. 2 is a sectional side view of an embodiment of the double rosette of this invention taking along section A-A' of FIG. 1.

FIG. 2 is a sectional view of FIG. 1 along section A—A' showing fingers 2 of the upper rosette, fingers 4 of the lower rosette, support rim 6, central hole 12 formed by the extremities of fingers 2 and 4 with common center 10, flat surfaces 14 in a plane essentially parallel to surface 16 of CD storage tray holder 8 showing CD 18 and 20 in place, and with shoulders 22 and 24 of fingers 2 and 4, respectively, of the upper and lower rosettes.

Although the invention has been described by reference to particular illustrative embodiments thereof, many variations and modifications of this invention may become apparent to those skilled in the art without departing from the spirit and scope of this invention as set forth in the appended claims hereto.

What is claimed is:

1. A storage tray for disc shaped elements having electronically stored recording media thereon and having a central opening, which storage tray has engagement means for holding and securing at least two disc shaped elements said engagements means comprising a plurality of raised flexible cantilever members centrally located in and part of the storage tray and which are in a circular arrangement with the ends thereof extending inwardly and being opened in the center thereof and which are capable of engaging the inner periphery of disc shaped elements, said plurality of raised flexible cantilever members comprising at least two concentric sets of such members one set of which is higher than the other set, respectively the upper and lower set of flexible cantilever members, said two concentric sets of flexible cantilever members emanate from one side of said storage tray.

2. The engagement means of claim 1 wherein the upper set of cantilever members are comprised of alternating cantilever members with respect to the contilever members of the lower rosette.

3. The engagement means of claim 1 wherein the extremities of the cantilever members of the lower set lie in a plane parallel to the base of the storage tray so as to form a flat surface.

4. The engagement means of claim 1 wherein the extremities of the cantilever members of the upper set lie in a plane parallel to the base of the storage tray so as to form a flat surface.

5. The engagement means of claim 1 wherein the extremities of the cantilever members of the lower and upper set lie in a plane parallel to the base of the storage tray such that each form a flat surface essentially parallel to the base of said tray.

6. The engagement means of claim 1 wherein the cantilever members of the upper and lower rosette emanate from a raised circular seat.

7. A normal single disc storage container comprising a top cover and bottom base pivotally attached at one end of the top cover and bottom base and having the disc storage tray of claim 1 contained therein.

8. The normal single disc storage container of claim 7 wherein the storage container contains the disc storage tray of claim 2.

9. The normal single disc storage container of claim 7 wherein the storage container contains the disc storage tray of claim 3.

10. A storage container comprising a top cover and bottom base pivotally attached at one end of the top cover and bottom base and having the disc storage tray of claim 1 contained therein and wherein the storage tray is rotatable when the storage container is in an open orientation.

11. The storage container of claim 10 wherein the storage tray is rotatable through an angle of at least 90 degrees.

12. The engagement means of claim 1 wherein the height of both the lower and upper set of raised cantilever members is not essentially greater than the inside depth of a standard single disc storage container.

\* \* \* \* \*